United States Patent [19]

Na

[11] Patent Number: 5,788,355
[45] Date of Patent: Aug. 4, 1998

[54] PROJECTOR WITH PROJECTION ANGLE ADJUSTING MEANS

[75] Inventor: Dae-Hee Na, Seoul, Rep. of Korea

[73] Assignee: Daewoo Electronics Co., Ltd., Rep. of Korea

[21] Appl. No.: 897,594

[22] Filed: Jul. 21, 1997

[30] Foreign Application Priority Data

Jul. 31, 1996 [KR] Rep. of Korea ................ 1996 32035

[51] Int. Cl.[6] ........................................... G03B 21/14
[52] U.S. Cl. ............................... 353/101; 353/70
[58] Field of Search .................... 353/69, 70, 101, 353/100

[56] References Cited

U.S. PATENT DOCUMENTS

| 4,092,063 | 5/1978 | Koester | 353/71 |
|---|---|---|---|
| 5,599,083 | 2/1997 | Mort | 353/69 |
| 5,622,417 | 4/1997 | Conner et al. | 353/70 |

FOREIGN PATENT DOCUMENTS

| 52-53425 | 4/1977 | Japan | 353/70 |
|---|---|---|---|

*Primary Examiner*—William Dowling
*Attorney, Agent, or Firm*—Pennie & Edmonds LLP

[57] ABSTRACT

There is disclosed a projector capable of electromechanically controlling the projection angle thereof. The projector of the present invention comprises a round movable member holding a projection lens holder. The round movable member has a gear portion meshed with a first gear rotated by a first motor and is circularly moved up or down with a hinge shaft of a reflection mirror being the center during the rotation of the first gear. The reflection mirror is rotatably supported by a pair of support members. An arcuate member is fixed to the rear surface of the reflection mirror and has a gear portion meshed with a second gear rotated by a second motor. A controller synchronously controls the first and the second motor so that the light reflected by the reflection mirror is transmitted through and projected onto a screen.

8 Claims, 5 Drawing Sheets

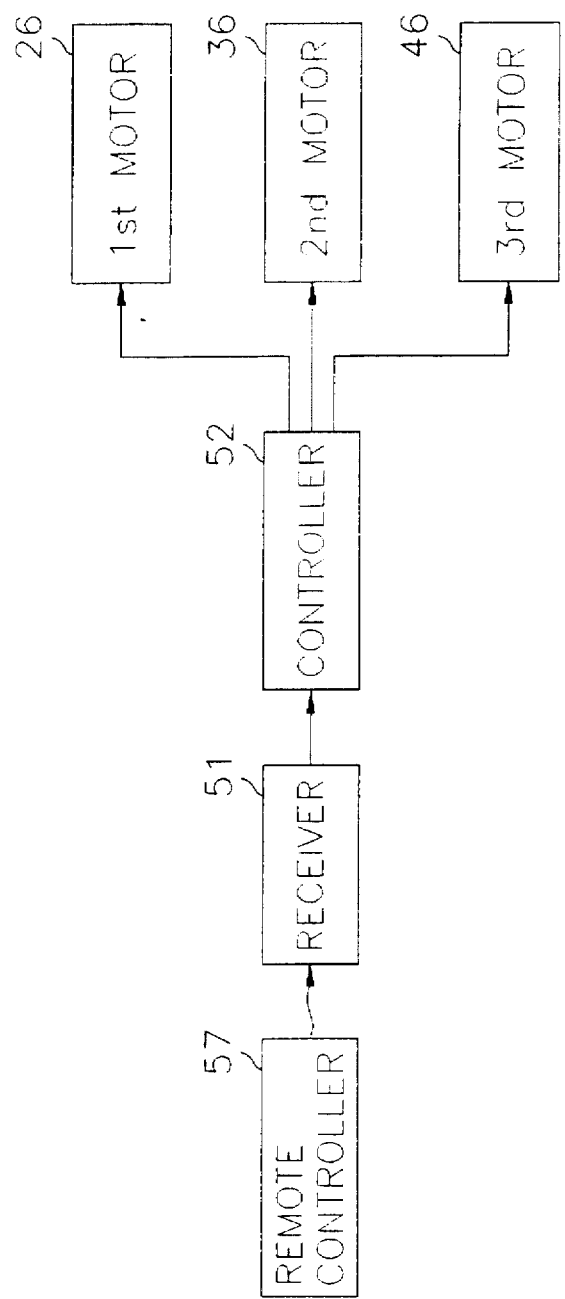

1

PROJECTOR WITH PROJECTION ANGLE ADJUSTING MEANS

FIELD OF THE INVENTION

The present invention relates to a projector; and more particularly, to a projector capable of electromechanically controlling the projection angle thereof.

BACKGROUND OF THE INVENTION

FIG. 1 presents a schematic perspective view of a prior art projector 1. The projector 1 has the projection lens holder 2 in which a plurality of lenses are disposed. The projection lens holder 2 is fixed to a front panel. Light from a light source (not shown) is projected to a screen through the projection lenses. The projector 1 has a number of screw members 4, e.g., two, as shown in FIG. 1, for adjusting the projection angle thereof.

In such a conventional projector, in order to change the projection angle up or down, an operator must rotate the screw members with his/her hand. This is, however, very cumbersome.

SUMMARY OF THE INVENTION

It is, therefore, a primary object of the present invention is to provide a projector capable of electromechanically controlling the projection angle thereof with ease.

In accordance with one aspect of the present invention, there is provided a projector having a projection lens holder in which a plurality of projection lenses are disposed and a reflection mirror spaced apart from the projection lens holder and reflecting light from a light source thereto, the projector comprising: means for rotating the reflection mirror about a hinge shaft; means for moving the projection lens holder up or down about the hinge shaft of the reflection mirror; and control means for synchronously controlling the projection lens holder moving means and the reflection mirror rotating means so that light reflected by the reflection mirror is transmitted through the projection lenses and projected onto a screen.

BRIEF DESCRIPTION OF THE DRAWINGS

The above and other objects and features of the present invention will become apparent from the following description of the preferred embodiment, when given in conjunction with the accompanying drawings, wherein:

FIG. 5 provides a block diagram of a control unit of the present invention.

DETAILED DESCRIPTION OF THE PREFERRED EMBODIMENTS

Figure 1:
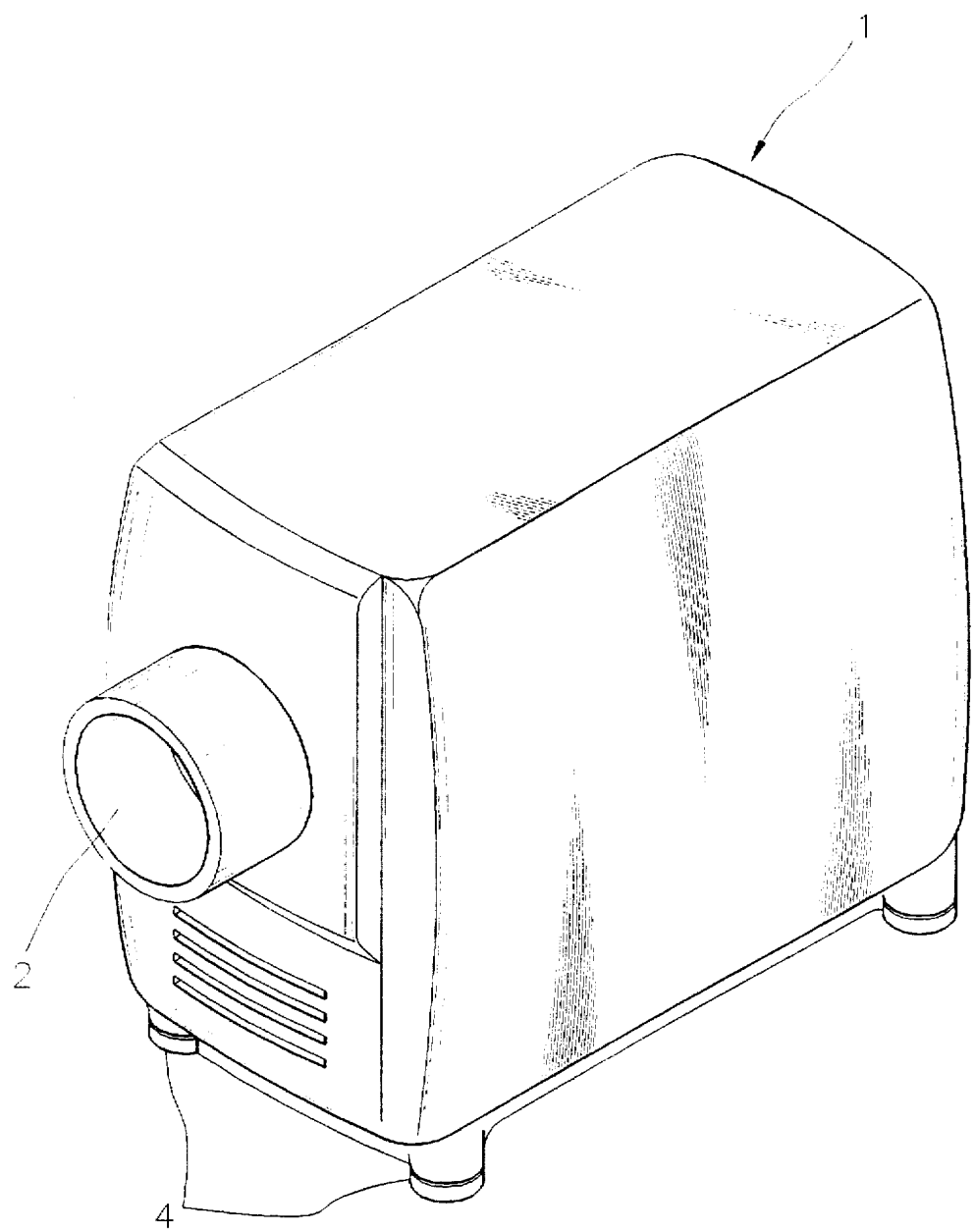
FIG. 1 presents a schematic perspective view of a prior art projector.
Figure 2:
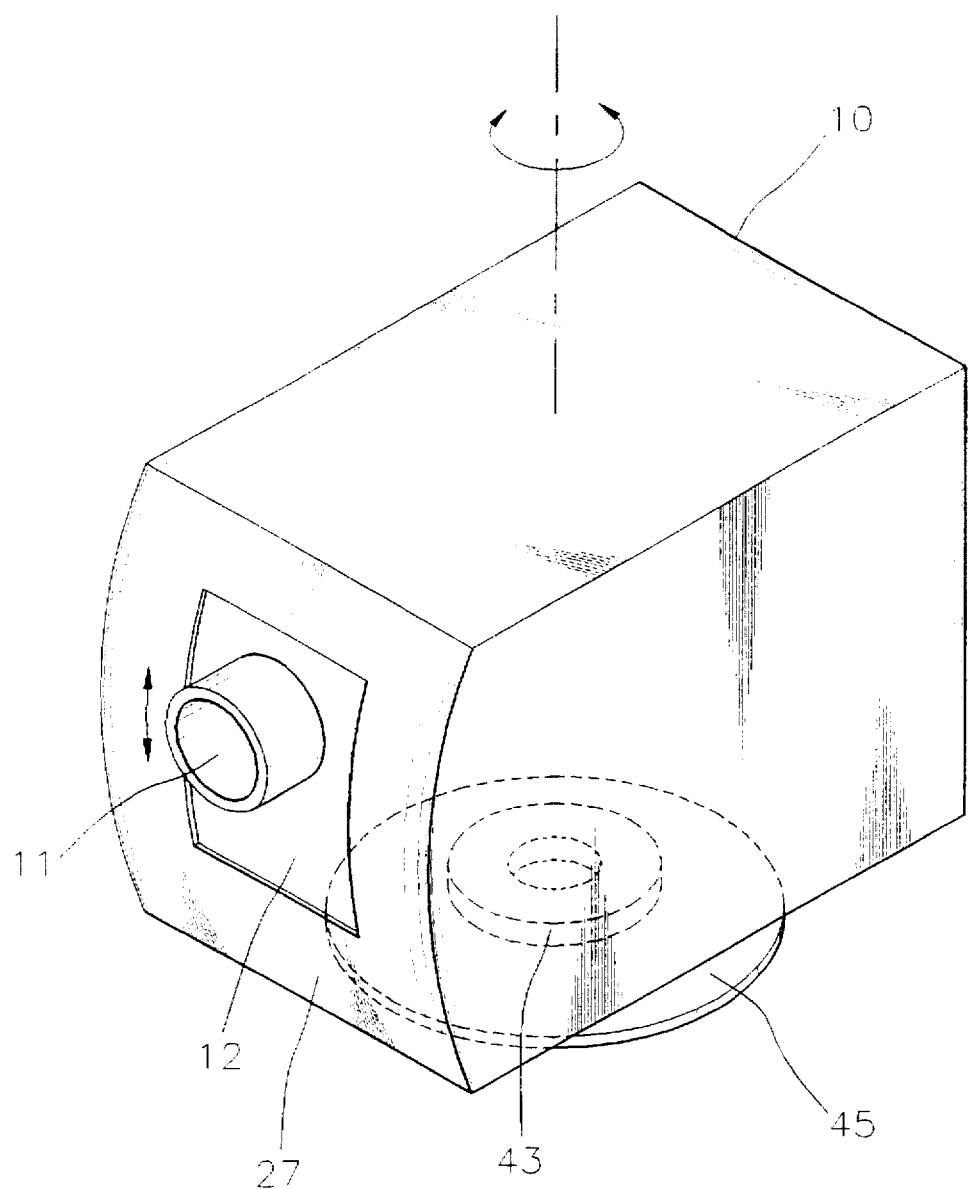
FIG. 2 shows a schematic perspective view of a projector in accordance with the present invention.

There are shown in FIGS. 2 to 5 various views of the projector in accordance with a preferred embodiment of the present invention. The projector of the present invention comprises a case 10 having a front panel 27 with a round guide groove 28, a projection lens holder 11 in which a plurality of projection lenses are disposed, means for rotating a reflection mirror 31 about a hinge shaft 32, means for circularly moving the projection lens holder 11 up or down about the hinge shaft 32, and control means for synchronously controlling the projection lens holder moving means and the reflection mirror rotating means so that light reflected by the reflection mirror 31 is transmitted through the projection lenses and projected onto a screen.

Figure 3:
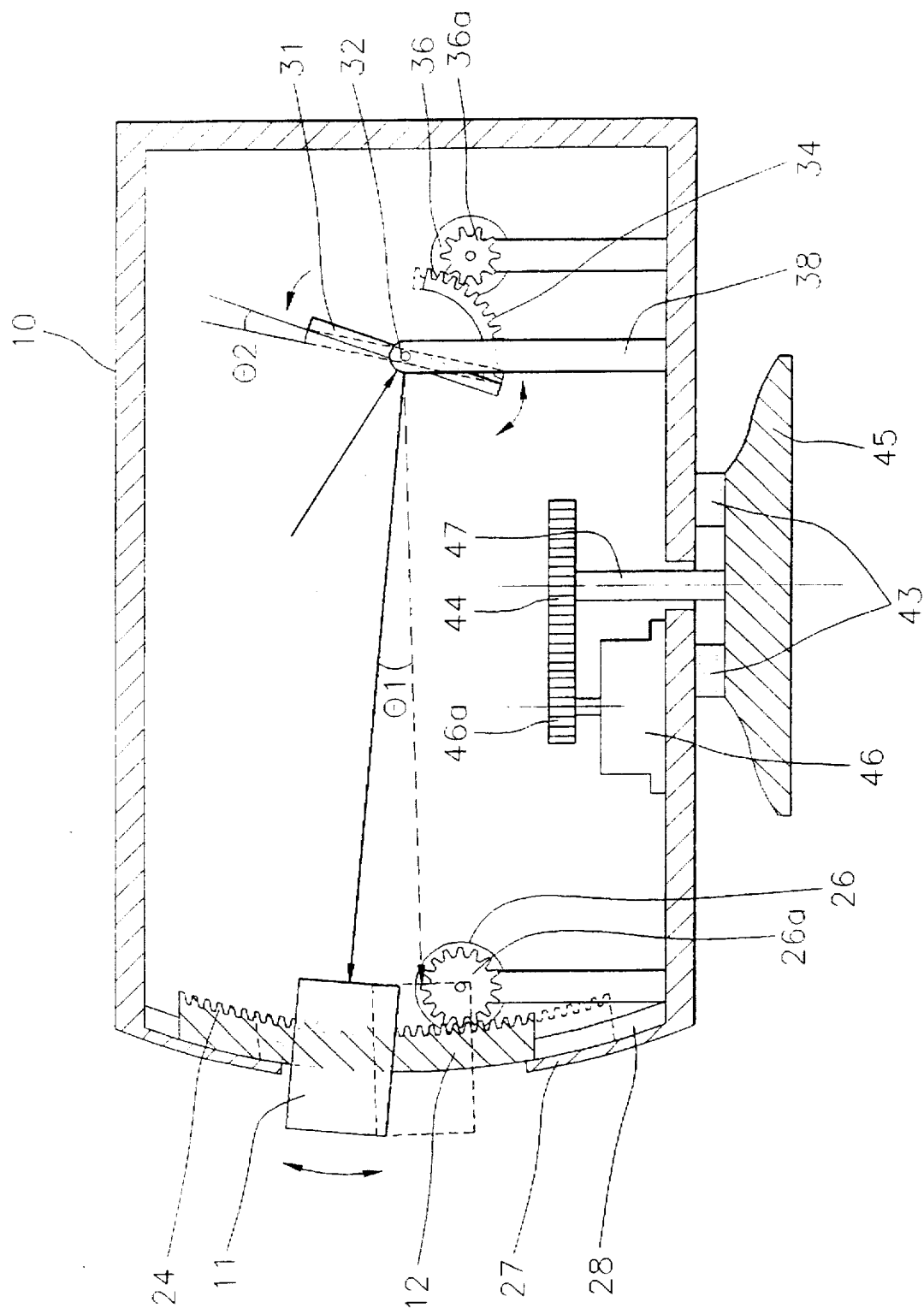
FIG. 3 illustrates a partial side sectional view of the projector of the present invention.

Referring to FIG. 3, the projection lens holder moving means includes a round movable member 12 holding the projection lens holder 11. The round movable member 12 is concentric with the front panel 27 of the case 10. The round movable member 12 is mounted in the round guide groove 28 of the front panel 27. The round movable member 12 is provided with a gear portion 24 which is meshed with a first gear 26a rotated by a first electric motor 26 so that, when the first motor 26 is actuated, the round movable member 12 and hence the projection lens holer 11 is circularly moved up or down along the guide groove 28 with the hinge shaft 32 of the reflection mirror 31 being the center of the rotation.

The reflection mirror rotating means includes a pair of support members 38 rotatably supporting the reflection mirror 31 in such a manner that a hinge shaft 32 of the reflection mirror 31 is situated at the center of the round movable member 12, and an arcuate member 34 attached to a rear surface of the reflection mirror 31. The center of the arcuate member 34 is located at the hinge shaft 32 of the reflection mirror 31 and the arcuate member 34 has a gear portion 34a which is meshed with a second gear 36a rotated by a second electric motor 36. Therefore, when the second electric motor 36 is actuated, the reflection mirror 31 is rotated about the hinge shaft 32.

In such a projector of the present invention, the up or down movement angle $\theta_1$ of the projection lens holder 11 must be twice the rotating angle $\theta_2$ of the reflection mirror 31. In other words, if the projection lens holder 11 is moved up by $\theta_1$, the reflection mirror 31 is rotated by $\theta_2$ which is half of $\theta_1$. In this way, the light from a light source (not shown), reflected by the reflection mirror 31, can be transmitted through the projection lenses in the lens holder 11 and projected onto the screen.

On the other hand, the projector of the present invention further comprises means for rotating the case 10 horizontally in order to adjust the horizontal projection angle. The case rotating means includes a base plate 45 rotatably supporting the case 10 through a thrust bearing 43. A fixed shaft 47 extends from top of the base plate and into the case 10. Tightly fitted on the upper end of the fixed shaft 47 is a fixed gear 44 meshed with a third gear 46a rotated by a third electric motor 46 of which the housing is fixed to the bottom of the case 10. The case 10, therefore, rotates around the fixed shaft 47 during the rotation of the third gear 46a.

FIG. 5 is a block diagram of a control system which controls the projection angle of the projector of the present invention.

The operation of the projector of the present invention will now be described with reference to FIGS. 2 to 5.

Signals from a remote controller 57 are received by a receiver 51 and transmitted to a controller 52.

When the signals to move the projection lens holder 11 up or down are transmitted to the controller 52, the controller 52 allows the first gear 26a to rotate clockwise or counterclockwise in FIG. 3, thereby adjusting the projection angle of the projector in the upward or downward direction. At the same time, the controller 52 allows the second gear 26a to rotate counterclockwise or clockwise in FIG. 3, thereby allowing the reflection mirror 31 to rotate by an angle half of the movement angle of the projection lens holder 11 in the same direction so that the light reflected by the reflection mirror 31 is transmitted through the projection lenses and projected onto a screen.

Figure 4:
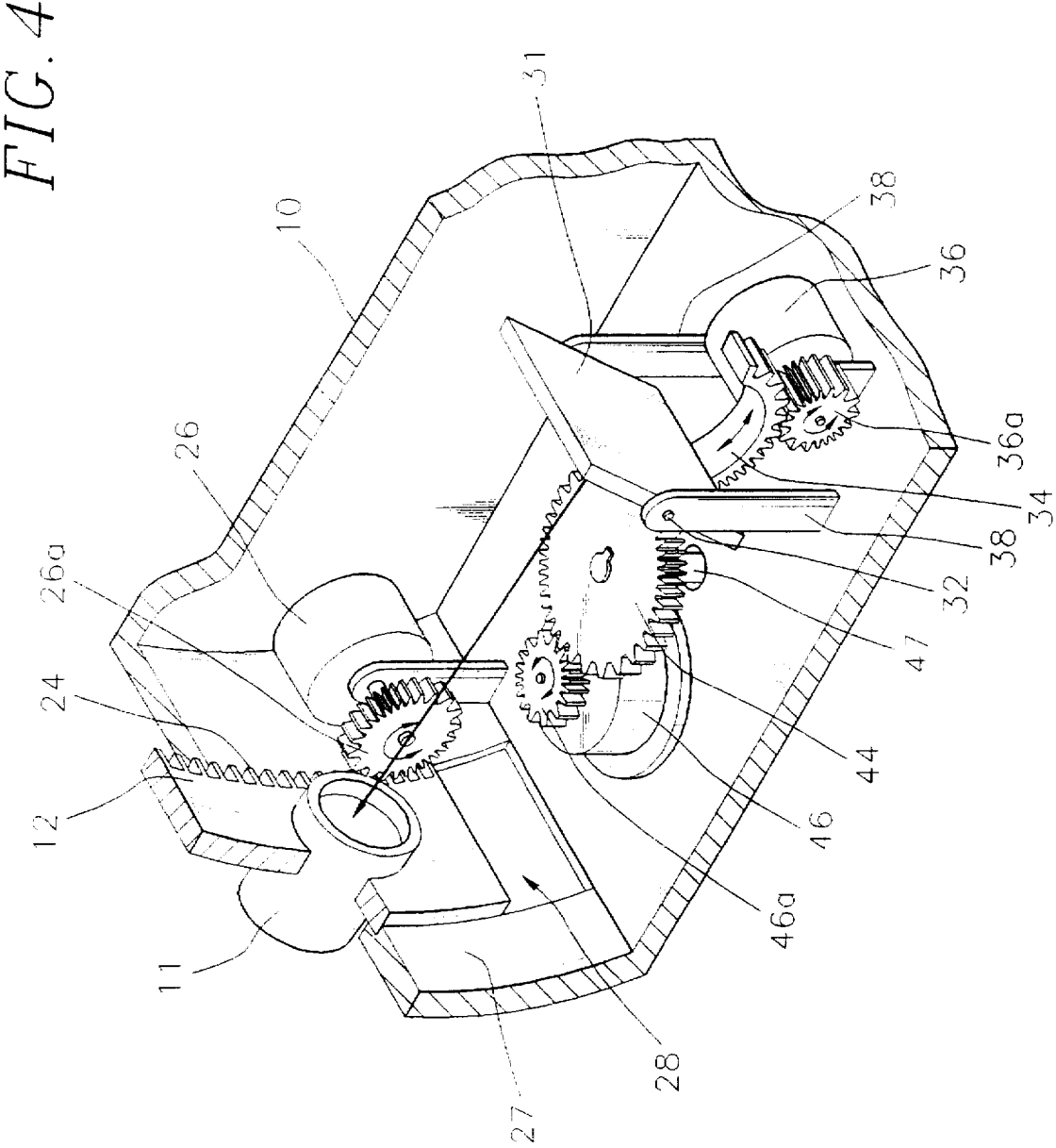
FIG. 4 represents a schematic perspective view of the projector of the present invention, showing the interior thereof.

Furthermore, when the signals to rotate the case 10 of the projector clockwise or counterclockwise are transmitted to the controller 52, the controller 52 allows the third gear 46a to rotate clockwise or counterclockwise in FIG. 4, thereby rotating the case 10 clockwise or counterclockwise around the fixed shaft 47 and adjusting the projection angle of the projector in the right or the left direction.

According to the projector of the present invention, since the projection angle is adjusted electro-mechanically without using the screw members as in the prior art projector, the ajdustment of the projection angle is convenient.

Although, the invention has been shown and described with respect to the preferred embodiment, it will be understood by those skilled in the art that various changes and modifications may be made without departing from the spirit and the scope of the invention as defined in the following claims.

What is claimed is:

1. A projector having a case, a projection lens holder in which a plurality of projection lenses are disposed and a reflection mirror spaced apart from the projection lens holder and reflecting light from a light source thereto, the projector comprising:

means for rotating the reflection mirror about a hinge shaft of the reflection mirror;

means for circularly moving the projection lens holder up or down about the hinge shaft of the reflection mirror; and control means for synchronously controlling the projection lens holder moving means and the reflection mirror rotating means so that light reflected by the reflection mirror is transmitted through the projection lenses and projected onto a screen.

2. The projector of claim 1, wherein the case having a front panel with a round guide groove and the projection lens holder moving means includes:

a round movable member being concentric with the round guide groove of the front panel of the case, the round movable member holding the projection lens holder and being mounted in the round guide groove of the front panel, the round movable member being provided with a gear portion; and a first gear meshed with the gear portion of the round movable member, the first gear being rotated by a first motor so that, when the first motor is activated, the round movable member and the projection lens holder are circularly moved with the hinge shaft of the reflection mirror being the center of rotation.

3. The projector of claim 1, wherein the reflection mirror rotating means includes:

a pair of supporting members rotatably supporting the reflection mirror in such a manner that the hinge shaft of the reflection mirror is situated at the center of the round movable member;

an arcuate member attached to a rear surface of the reflection mirror, the arcuate member having a gear portion; and a second gear meshed with the gear portion of the arcuate member, the second gear being rotated by a second motor.

4. The projector of claim 2, wherein the reflection mirror rotating means includes:

a pair of supporting members rotatably supporting the reflection mirror in such a manner that the hinge shaft of the reflection mirror is situated at the center of the round movable member;

an arcuate member attached to a rear surface of the reflection mirror, the arcuate member having a gear portion; and a second gear meshed with the gear portion of the arcuate member, the second gear being rotated by a second motor.

5. The projector of claim 4, wherein the control means allows the first gear to rotate so that the projection lens holder is moved up or down and, at the same time, allows the second gear to rotate so that the reflection mirror is rotated by an angle which is half of the movement angle of the projection lens holder in the same direction.

6. The projector of claim 1, further comprising means for rotating the case horizontally.

7. The projector of claim 6, wherein the case rotating means includes:

a base plate rotatably supporting the case;

a fixed shaft extending from top of the base plate and into the case;

a fixed gear tightly fitted on a fixed shaft; and a third gear meshed with the fixed gear, the third gear being rotated by a third motor.

8. The projector of claim 7, wherein the control means allows the third gear to rotate so that the case is rotated around the fixed shaft.

\* \* \* \* \*